Figure 1:
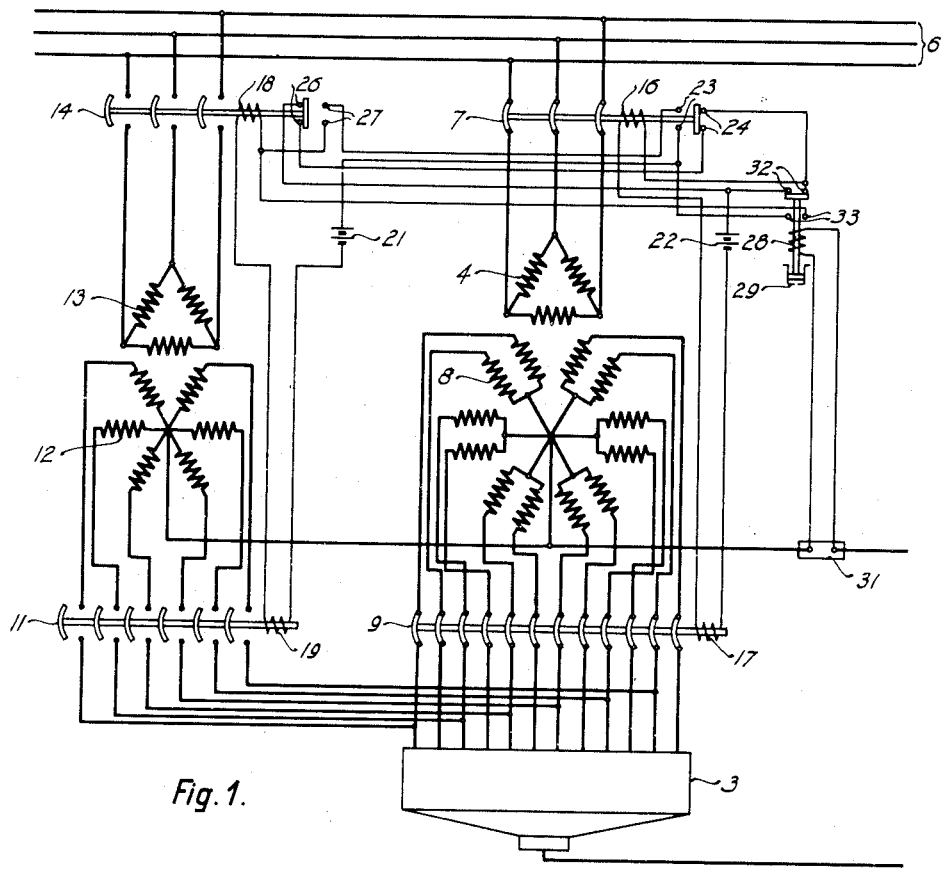

July 17, 1934.    G. A. BURNHAM    1,966,810
ELECTRIC CURRENT RECTIFYING SYSTEM
Filed Nov. 29, 1930

Inventor
George A. Burnham
By
Attorney

Patented July 17, 1934

1,966,810

UNITED STATES PATENT OFFICE 1,966,810

ELECTRIC CURRENT RECTIFYING SYSTEM

George A. Burnham, Saugus, Mass., assignor, by mesne assignments, to Allis-Chalmers Manufacturing Company, Milwaukee, Wis., a corporation of Delaware Application November 29, 1930, Serial No. 498,925

8 Claims. (Cl. 175—363)

This invention relates to improvements in current converting systems utilizing a rectifier of the metallic vapor arc type and particularly to such systems when employed to supply direct-current requirements ranging from no-load to full-load.

Mercury vapor arc rectifiers are frequently employed to supply direct-current for use on traction systems such as electric railroads or electric street railways. When used on such systems the load carried by the rectifier is extremely variable, ranging from no-load to full-load, so that the rectifier is usually loaded to its rated capacity only for short intervals of time and is loaded to only a fraction of its rated capacity for long periods of time. The rectifier is supplied with alternating current from a source through a transformer which introduces certain losses into the circuit which losses may be divided into copper losses, varying as a function of the load carried, and into iron losses which are constant independently of the load carried by the transformer. The iron losses are usually restricted to a very small percentage of the full-load capacity of the transformer but it will be easily understood that, if the load of the transformer is gradually decreased, these constant losses gradually increase in comparison to the load so that, when the load is very small, the efficiency of the transformer and therefore the efficiency of the rectifier installation is relatively very low. As a result of the above condition, a rectifier installation having a very high full-load efficiency may have a very low continuous efficiency.

The iron losses of a transformer, also called the no-load losses, are substantially proportional to the rating of the transformer so that it is possible to increase the efficiency of the rectifier installation at low-load by substituting another transformer having a lower rating and therefore lower iron losses for the supply transformer or, if the rectifier is supplied by two or more transformers, by disconnecting one or more of the transformers as the load decreases thereby eliminating the standby losses in the disconnected transformer.

It is, therefore, among the objects of the present invention to provide a current rectifying system in which the efficiency at less than full-load will be comparable to the efficiency at normal load.

Another object of the invention is to provide a current rectifying system in which the rectifier is supplied from a plurality of transformers of different ratings which are alternately connected into the circuits in function of the load.

Another object of the invention is to provide a current rectifying system in which the rectifier is supplied from a plurality of transformers having the same rating of which one or more may be disconnected in function of the load at light loads on the system.

Another object of the invention is to provide a current rectifying system in which the transformer supply connections thereof are automatically changed in function of and proportionally to the load.

Another object of the invention is to provide a current rectifying system in which each anode of the rectifier continuously carries a current comparable to full load current thereby insuring the most satisfactory operation of the rectifier.

Figure 2:
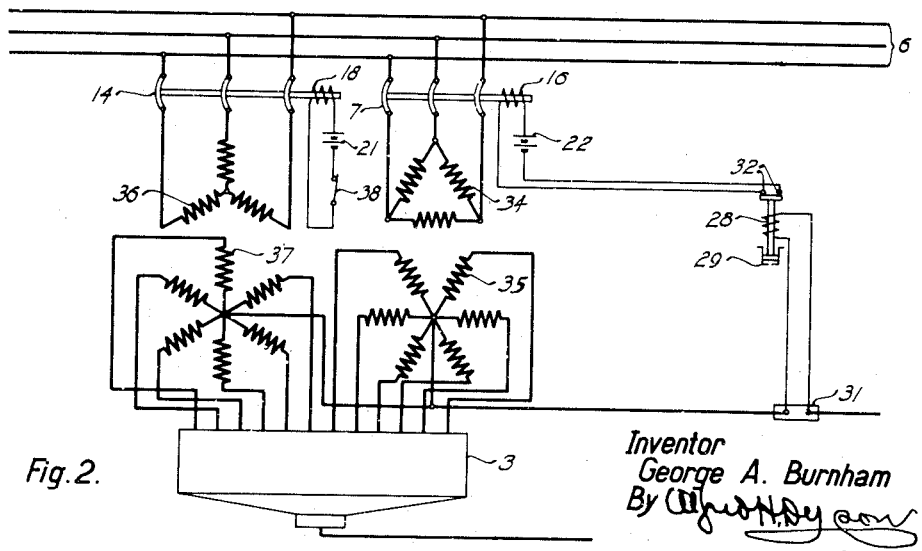

Objects and advantages, other than those above set forth, will be apparent from the following description when read in connection with the accompanying drawing in which Figure 1 shows a current rectifying system in which a rectifier is supplied from a transformer of large size for which a transformer of smaller size may be automatically substituted, and Fig. 2 shows a current rectifying system in which a rectifier is supplied by two transformers of equal capacities at full-load and is supplied by only one of the transformers at light load, the other transformer being automatically disconnected.

Referring more particularly to the drawing by characters of reference, the reference numeral 3 designates an electric current rectifier which may be of the metallic vapor arc or any other known type. The rectifier is supplied by a transformer having a primary winding 4 connected with an alternating current supply line 6 from a suitable source by a circuit breaker 7 and having a secondary winding 8 connected with the anodes of the rectifier 3 by a circuit breaker 9. It will be understood that the transformer 4, 8 is of such capacity as to be capable of supplying the rectifier 3 with current up to its rated capacity. Alternate anodes of the rectifier 3 are also connected through a circuit breaker 11 with the secondary winding 12 of a transformer, the primary winding 13 of which is connected through a circuit breaker 14 to the supply line 6. The rectifier 3 delivers direct-current to a circuit formed by a conductor leading from the cathode thereof and from the neutral points of the transformer secondary winding to direct-current consuming devices (not shown). Transformer 12, 13 being arranged to supply current to only half of the anodes and therefore to produce only half the rated capacity of the rectifier need be only half the size of the transformer 4, 8. When the rectifier is to operate at half or less than half its rated capacity, transformer 4, 8 is disconnected automatically and transformer 12, 13 is connected automatically as will be described hereinafter. The reduction in the size of the transformer operating reduces the iron losses and the proportion of the iron losses to the load is decreased thereby increasing the operating efficiency of the system at light load.

Each of the circuit breakers 7 and 9 and 11 and 14 is provided with an operating coil 16 and 17 and 19 and 18 respectively which are capable of being energized from suitable sources of currents 21 and 22 connected therewith and controlled in dependence on the load on rectifier 3. Circuit breakers 7 and 14 are each provided with two pairs of auxiliary contacts 23 and 24 and 26 and 27 respectively which are inter-connected with each other and the operating coils 17 and 19 of circuit breakers 9 and 11 and with a relay 28 having a dash pot 29 or other suitable delay device connected therewith. The coil of the relay 28 is connected across a shunt 31 serially connected in one conductor of the direct-current circuit and the relay controls a pair of contacts 32 and 33 inter-connected with the current sources 21 and 22 and circuit breaker auxiliary contacts 23, 24 and 26, 27.

The operation of the system as shown in Fig. 1 will be readily comprehended from the following in which it is assumed that the various connections of the system are as shown i. e. circuit breakers 7 and 9 are closed to connect transformer 4, 8 with the supply line 6 and with the rectifier 3. Assuming further that the load on the direct-current circuit does not drop below half the rated capacity of the rectifier for any appreciable length of time, the coil of the relay 28 will be energized from current flowing in the direct current circuit and the armature thereof will be raised to bridge contacts 32 thereby closing a circuit from battery 22 through coils 17 and 16 which retain circuit breakers 7 and 9 in their closed position. Circuit breaker 7, in its closed position, bridges auxiliary contacts 24 thereof which establishes a holding circuit for the circuit breakers 7 and 9 from battery 22 through circuit breaker coils 17, 16, auxiliary contacts 24 of circuit breaker 7 and auxiliary contacts 26 of circuit breaker 14. Circuit breakers 7 and 9 will therefore remain closed even though the armature of the relay 28 drops and opens the contacts 32. The rectifier 3 is thus supplied through transformer 4, 8; the secondary winding 8 thereof being of the double six-phase type supplying a rectifier of the twelve-anode type as shown.

As soon however, as the load on the direct-current circuit drops below half the rated capacity of the rectifier for any appreciable length of time, the coil of relay 28 no longer being sufficiently energized to retain the armature of the relay in its raised position, the dash pot 29 will permit the armature to drop slowly thereby opening contacts 32. Such action however does not affect the circuit of coils 16 and 17 due to the bridging of the contacts 24 and 26 as previously set forth. As soon, however, as the armature of relay 28 has reached its lower end position, contacts 33 are bridged thereby completing a circuit from battery 21 through coils 19 and 18 and over contacts 33. Coils 19 and 18 then close circuit breakers 11 and 14 and, by closing of circuit breaker 14 the auxiliary contacts 27 are opened, thereby interrupting the holding circuit above set forth for coils 16 and 17 whereupon circuit breakers 7 and 9 are opened. Circuit breaker 7, upon opening, bridges the auxiliary contacts 23 thereof which complete a holding circuit from battery 21 through coils 19 and 18 and over contacts 27 and 23. Circuit breakers 11 and 14 will thus remain closed even though relay 28 lifts and opens contacts 28.

Transformer 4, 8, as shown above, will therefore be disconnected only after transformer 12, 13 is connected so that the supply of current to the rectifier 3 is never interrupted. Transformer 12, 13 is so dimensioned that it will carry only one-half of the rated output of the rectifier and that its iron losses are therefore approximately only one-half of those of the transformer 4, 8. It will be noted that the transformer secondary winding 12 is of the six-phase type and is connected to only six anodes of the rectifier so that, at half-load on the direct-current circuits the six anodes each carry the same current from transformer 12, 13 as they would carry at full load from transformer 4, 8 thereby improving the operating of the rectifier. If the load increases to more than half of the full-load, relay 28 will, after a time delay determined by dash pot 29, be raised to its upper end position shown in the drawing, and it will be readily seen that the sequence of operations in reclosing circuit breakers 7 and 9 and re-opening circuit breakers 11 and 14 will be exactly the reverse of that described above for the opening and closing operations respectively.

In the embodiment above described, if a failure occurs in transformer 12, 13 the rectifier can be continuously supplied at its full capacity from transformer 4, 8. The installation may however be considerably simplified by the use of two transformers of equal capacity having ratings of one-half of that of the rectifier, in which case however failure of one of the transformers limits the output of the rectifier to half its total capacity. The connections of the system will then be as shown in Fig. 2 in which circuit breakers 9 and 11 are omitted for the reason that, circuit breaker 8 being opened, transformer 34, 35 could be excited only from winding 37 through rectifier 3, which however is impossible due to the valve action of the arc. The rectifier 3 is supplied from the two transformers 34, 35 and 36, 37 of equal capacity. Transformer 36, 37 is arranged to be continuously connected to the supply line 6 when switch 38 is voluntarily opened whereas transformer 32, 33 is connected or disconnected in dependence on the load by means of relay 28 connected through the shunt 31 with the direct-current circuit.

The operation of the relay 28 and its action upon the circuit breaker 7 are believed to be so apparent as to render any explanation thereof unnecessary. If the rectifier carries a load greater than half its rated capacity, the connections will be as shown in Fig. 2 and both transformers will be in operation. Each transformer is then connected to one set of six anodes in the rectifier 3 and, if the two transformers are identical, current will flow through the rectifier in parallel arc attached to one anode of each system. If, however, winding 34 is connected in delta as shown and winding 36 is connected in star as shown, only one arc will be struck and will attach alternately to the anodes of each system in sequence thereby obtaining a twelve-phase cycle of operation instead of a six-phase cycle of operation as would be obtained otherwise. It will be apparent that the rectifier 3 may be provided with a greater number of anodes, that three or more transformers may be connected to the rectifier with connections similar to those shown either in Fig. 1 or in Fig. 2.

Although but two embodiments of the present invention have been illustrated and described, it will be apparent to those skilled in the art that various changes and modifications may be made therein without departing from the spirit of the invention or from the scope of the appended claims.

The invention claimed is:

1. In an electric current rectifying system, a source of alternating current supply, an electric current rectifier, a plurality of transformers of different capacities each having a primary and a secondary winding, a direct current circuit energized from said rectifier, circuit breakers for selectively connecting the primary windings of said transformers with said source of alternating current and for selectively connecting the secondary windings of said transformers with said rectifier, and means connected with said direct current circuit and with said circuit breakers for controlling the operation of the latter in dependence on the load on the former.

2. In an electric current rectifying system, a source of alternating current supply, an electric current rectifier of the metallic vapor arc type, a plurality of transformers of different capacities each having a primary and a secondary winding, a direct current circuit energized from said rectifier, circuit breakers for selectively connecting the primary windings of said transformers with said source of alternating current and for selectively connecting the secondary windings of said transformers with said rectifier, a coil controlling the opening of each of said circuit breakers, and means connected with and controlling energization of said coils in dependence on the load in said direct current circuit.

3. In an electric current rectifying system, a source of alternating current supply, an electric current rectifier of the metallic vapor arc type, a plurality of transformers each having a primary and a secondary winding, a direct current circuit energized from said rectifier, circuit breakers for connecting the primary windings of said transformers with said source of alternating current and for connecting the secondary windings of said transformers with said rectifier, a releasing coil controlling the opening of each of said circuit breakers, said circuit breakers connecting the primary windings of said transformers with said source of alternating current supply having auxiliary contacts partially controlling the energization of said coils, sources of current connected with and capable of energizing said coils, and a relay energized from said direct current circuit operative to control energization of said coils in dependence on the load in said direct current circuit.

4. In an electric current rectifying system, a source of alternating current supply, an electric current rectifier, a plurality of transformers each having a primary and a secondary winding, said transformers being of different capacities, a direct current circuit energized from said rectifier, circuit breakers for connecting the primary windings of said transformers with said source of alternating current and for connecting the secondary windings of said transformers with said rectifier, said circuit breakers connecting the primary windings of said transformers with said source of alternating current supply having auxiliary contacts, a releasing coil controlling the opening of each of said circuit breakers, sources of current connected with and capable of energizing said coils, and a relay energized from said direct current circuit to aid in controlling energization of said coil in dependence on the load in said direct current circuit, said relay having its operation delayed to disconnect one of said transformers only after another of said transformers is connected.

5. In a system of distribution, the combination of a source of alternating current supply, a work circuit subject to variable loads, a current rectifying device for converting alternating current from said source into direct current and supplying it to said work circuit, a pair of transformers for connecting said source of alternating current with said rectifier, switch means for each of said transformers operable to effect the connection and disconnection thereof with and from the said source of alternating current and the said rectifier, and means operable responsive to current flow in said work circuit above a predetermined value to cause actuations of said switch means to effect the said connections of one of said transformers and the said disconnections of the other of said transformers.

6. In a system of distribution, the combination of a source of alternating current supply, a work circuit subject to variable loads, a current rectifying device for converting alternating current from said source into direct current and supplying it to said work circuit, a pair of transformers for connecting said source of alternating current with said rectifier, switch means for each of said transformers operable to effect the connection and disconnection thereof with and from the said source of alternating current and the said rectifier, and control means operable responsive to flow of current in said work circuit above a predetermined value to cause actuations of said switch means to effect said connections of one of said transformers and the said disconnections of the other of said transformers, the said control means being operable in such manner as to prevent the said disconnecting actuations of said switch means prior to the connecting actuation thereof to thereby effect the said connections of one or the other of the said transformers before the said disconnections of one or the other thereof.

7. In a system of distribution, the combination of a source of alternating current, a work circuit subject to variable loads, a current rectifying device for converting alternating current from said source into direct current and supplying it to said work circuit, a pair of transformers of different capacity for connecting said source of alternating current with said rectifier, switch means for each of said transformers operable to effect the connection and disconnection thereof with and from the said source of alternating current and the said device, and control means operable responsive to the flow of current in said work circuit above a predetermined value to cause actuations of said switch means to effect the said connections of the said transformer of greater capacity and to thereupon effect the said disconnections of the transformer of lesser capacity and operable responsive to flow of current in said work circuit below a predetermined value to cause actuations of said switch means to effect the said connections of the said transformer of lesser capacity and to thereupon effect the said disconnections of the said transformer of greater capacity, the said switch means and said control means each being provided with elements cooperating to effect the said connections before effecting the said disconnections of the transformers.

8. In an electric current rectifying system, a source of alternating current supply, an electric current rectifier, a plurality of transformers of different capacities each having a primary winding and a secondary winding, a direct current circuit supplied from said rectifier, circuit breakers for selectively connecting the primary windings of said transformers with said source of alternating current supply and for selectively connecting the secondary windings of said transformers with said rectifier, a coil for each of said circuit breakers controlling the operations thereof, sources of current for energizing said coils, the said circuit breakers for connecting the primary windings of said transformers with said source of alternating current supply having auxiliary contacts controlling the operative connections of said sources of current with said coils, and means connected with and controlling the energization of said coils in dependence on the magnitude of the current supplied to said direct current circuit by said rectifier.

GEORGE A. BURNHAM.